W. PERKINS.
FURROW OPENER.
APPLICATION FILED SEPT. 9, 1910.
988,284.
Patented Mar. 28, 1911.
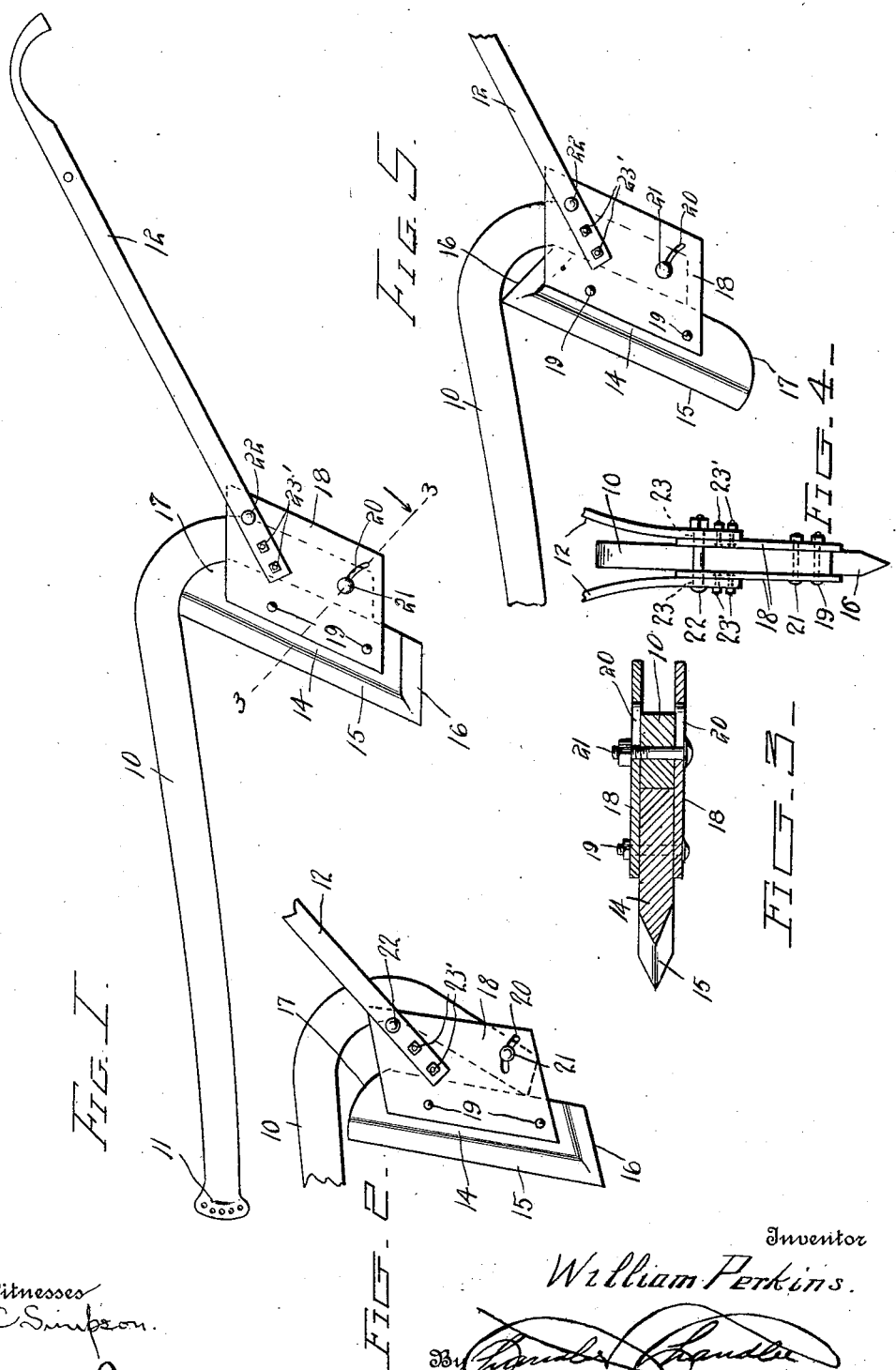

UNITED STATES PATENT OFFICE.

WILLIAM PERKINS, OF COLUMBIA, OKLAHOMA, ASSIGNOR OF ONE-HALF TO ALFRED C. HEDRICK, OF COLUMBIA, OKLAHOMA.

FURROW-OPENER.

988,284.  Specification of Letters Patent.  Patented Mar. 28, 1911.

Application filed September 9, 1910. Serial No. 581,211.

*To all whom it may concern:*

Be it known that I, WILLIAM PERKINS, a citizen of the United States, residing at Columbia, in the county of Kingfisher, State of Oklahoma, have invented certain new and useful Improvements in Furrow-Openers; and I do hereby declare the following to be a full, clear, and exact description of the invention, such as will enable others skilled in the art to which it appertains to make and use the same.

This invention relates to plows for working "grub" land and has for its object to provide a tilting share that will permit of the removal of the plow after becoming embedded in a stump, rock, or other foreign substance in the soil.

The invention resides in the novel form of share and its connection to the plow beam.

In the accompanying drawings forming part of this specification:—Figure 1 is a side elevation of the plow showing the share in operative position. Fig. 2 is a side elevation of the plow showing the share in tilted position to permit of the disengagement of the plow from a stump or rock. Fig. 3 is a cross sectional view taken on the line 3—3, Fig. 1. Fig. 4 is an end elevation of the plow. Fig. 5 is a fragmental view in elevation showing the share reversed.

The reference character 10 designates a plow beam having at one end the usual attaching iron 11 and at its opposite end a pair of handles 12, the plow beam being curved downwardly adjacent the handles. Formed in the curved portion of the plow beam is a transverse circular opening 13 which receives the pivot bolt of the plow share.

The plow share 14 is preferably formed from a single straight bar of metal having its leading longitudinal edge sharpened to form a cutting edge 15 and its lower edge sharpened to form a cutting edge 16. The plow share is preferably the same in thickness as the beam and is provided on its rear upper corner with a rounded edge 17 which conforms snugly to the contour of the under side of the plow beam.

Arranged upon the opposite side faces of the plow share is a pair of clamping plates 18, these plates being sufficient in width to overlap a portion of the share and to extend rearwardly beyond the rearmost edge of the beam. These plates are preferably bolted to the sides of the plow share as shown at 19. Each plate is provided with an inclined slot 20, these slots registering with the bolt opening 13 of the plow beam. Passed through the inclined slots in the clamping plates and circular opening in the beam is a pivot bolt 21, this bolt being slidingly fitted in the slots so that the uppermost end of the plow share may tilt forwardly as shown in Fig. 2. It is now clear that when the leading point of the plow share becomes embedded in a rock, stump or similar foreign substance, this free pivotal movement of the plow share permits of the point being much more easily disengaged than were the share fixed upon the plow beam as in ordinary plows.

For locking the share in operative position, a locking bolt 22 is provided, this locking bolt being engaged through a pair of alined circular openings 23 formed in the clamping plates considerably above the slots therein. When the plow share is in operative position, this bolt engages the rearmost face of the beam and positively prevents any tilting movement of the share. The handles it will be noted are bolted to the outer faces of the plates as shown at 23, and the handle constitutes means for rocking the plow share in its pivot whereby to quickly disengage the share from a stump or the like.

As shown in Fig. 5 the share is reversible that is the bolts 19 may be removed and the ends of the share reversed, the bolts then being again inserted to secure the share in position.

What is claimed is:—

1. In a plow, a beam having a downwardly curved rear end, a share having one edge fitting in and conforming to the contour of said curved end, a pair of clamping plates fixed to the share and slidingly fitting said end, means for securing said clamping plates and end together and permitting of a free pivotal movement of said share, and a means for locking said share against movement.

2. In a plow, a beam having a downwardly curved rear end, a plow share mounted in advance of said end, a pair of clamping plates carried by said share and slidingly fitting said end, said clamping plates having alined slots registering with said beam, a pivot bolt passed through said slots and beam and permitting of a pivotal movement of said share, and a locking bolt passed through said plates above said pivot bolt and engaging said beam whereby to lock the share against movement.

In testimony whereof, I affix my signature, in presence of two witnesses.

WILLIAM PERKINS.

Witnesses:
J. L. HINES,
V. F. MUNCH.

Copies of this patent may be obtained for five cents each, by addressing the "Commissioner of Patents, Washington, D. C."